June 13, 1967  R. ASHTON ETAL  3,324,637
COMBINE HAVING QUICK DETACHABLE HEADER
Filed June 26, 1964  4 Sheets-Sheet 3

INVENTORS.
ROBERT ASHTON &
JOHN J. WINDSOR
BY
Tweedale & Gerhardt
ATTORNEYS.

INVENTORS.
ROBERT ASHTON &
JOHN J. WINDSOR
BY Tweedale & Gerhardt
ATTORNEYS.

United States Patent Office 3,324,637
Patented June 13, 1967

3,324,637
COMBINE HAVING QUICK DETACHABLE HEADER
Robert Ashton, Islington, Ontario, and John Joseph Windsor, Scarborough, Ontario, Canada, assignors to Massey-Ferguson Limited, Toronto, Ontario, Canada
Filed June 26, 1964, Ser. No. 378,343
8 Claims. (Cl. 56—21)

This invention relates generally to combines and more particularly to combines having detachable headers.

With the steady increase in size, power and the cost of self-propelled combines, it is becoming common practice to detach the headers for transport as well as to use the same combine for harvesting both row crops and grasses by changing the header to accommodate the different crops. With presently available combines, however, the elevator and header must be aligned both laterally and vertically before they can be brought into engagement and coupled together, and the operator must dismount from the operator's platform to lock the coupling members against accidental disconnection. Considerable time, effort and exertion is required on the part of the operator to carry out the foregoing operations.

The present invention lies in the provision of a combine in which the header can be automatically connected and disconnected from the main body of the combine by remote control from the operator's platform. Improved coupling elements are provided on the header and combines which, by manipulation of the hydraulic power equipment of the combine, can be automatically coupled or uncoupled to connect or deteach, respectively, the header from the combine. Little or no effort is required on the part of the operator other than that of manipulating the combine controls to couple or uncouple the header to or from the combine.

For transport, the header can be placed onto a wagon by the combine elevator and automatically uncoupled from the elevator, and can be lifted from the wagon or other vehicle automatically by the elevator to couple the header thereto. Since both a grain header and corn header are attachable to the same elevator, considerable cost savings result to the farmer and manufacturer.

The objects, advantages and features of the invention will become apparent from the following description of a specific embodiment of the invention illustrated in the accompanying drawings in which.

While the invention will be described in connection with a preferred embodiment, it will be understood that we do not intend to limit the invention to the specific embodiment illustrated. On the contrary, it is intended that all alternatives, modifications and equivalents as may be included within the spirit and scope of the invention are to be covered by the present application.

Figure 1:
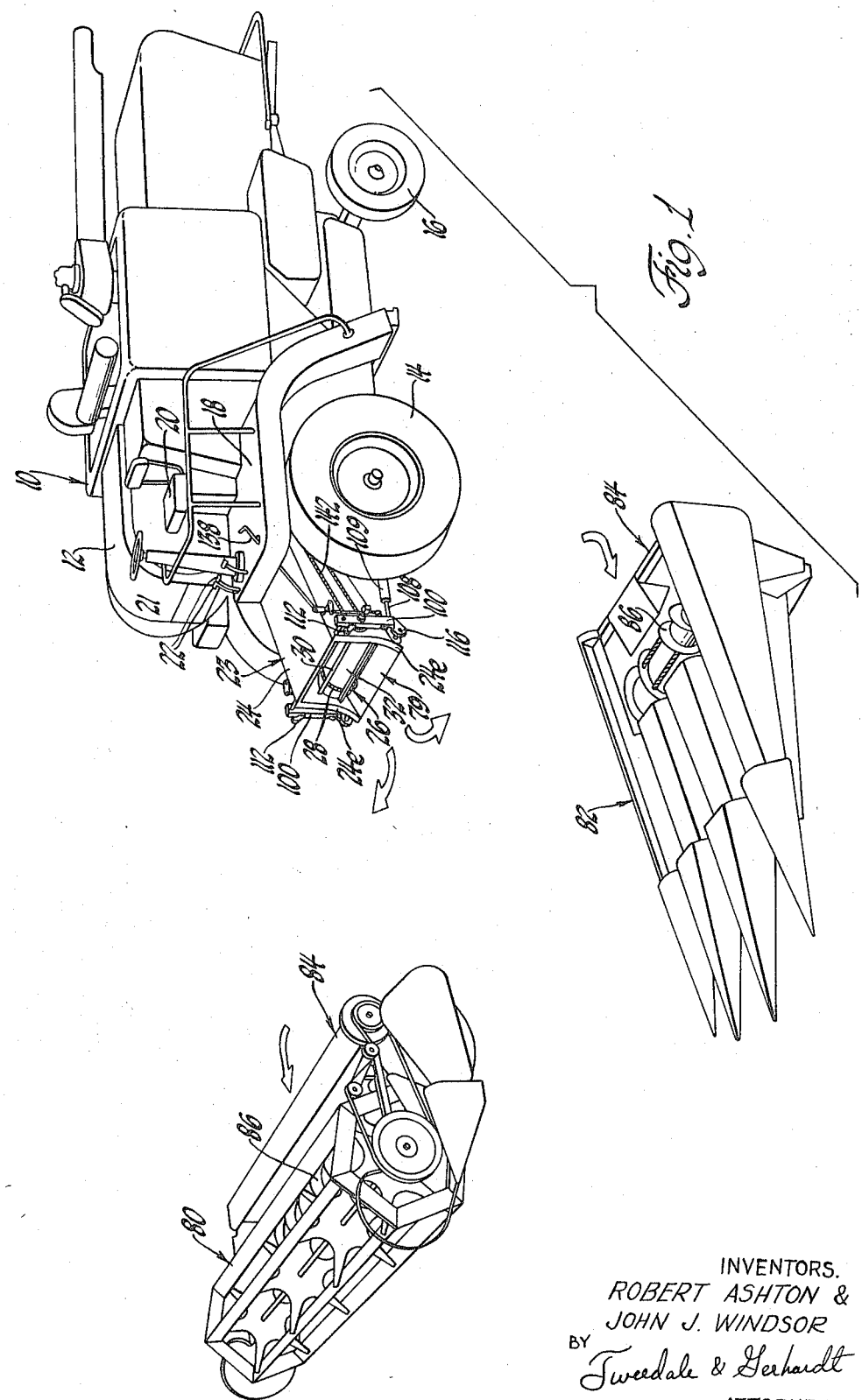
FIG. 1 is a perspective view of a combine with a detachable grain head and corn head.

With reference to FIG. 1, a combine is designated generally by reference numeral 10 and includes a main body 12, front and rear wheels 14 and 16, respectively, and an operator's platform 18. Supported on platform 18 is a seat 20, steering column 22, and control pedals 23 by means of which the operator steers the combine and operates the various components.

Combine 10 includes an elevator 23 having an open ended housing 24 for a conveyor 26. Housing 24 includes side walls 24a and b and bottom and top walls 24c and d, respectively, and is mounted for pivotal movement about the axis of a shaft 25 (FIG. 4) extending transversely to the longitudinal axis of the combine. Conveyor 26 is made up of chains 28 between which are mounted flights or slat elements 30 for transferring the harvested material from the header to the crop treating mechanism of the combine.

Figure 4:
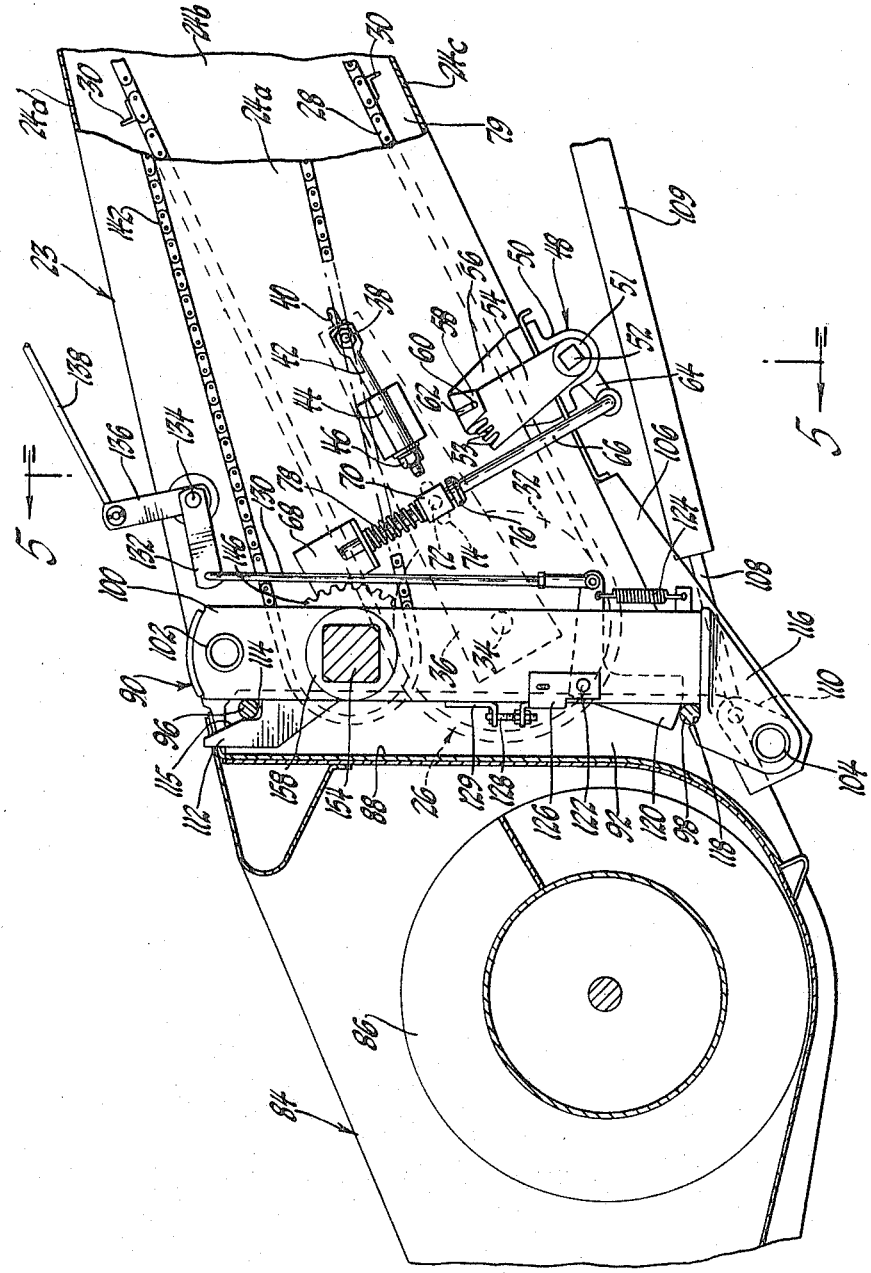
FIG. 4 is an enlarged sectional detail view of the quick attach coupling with the header attached to the combine.

Chains 28 are trained about cylindrical members 32, only one of which is visible in the drawings. Cylindrical member 32 has its shaft 34 journalled in a support plate 36 (FIGS. 4 and 5) which is pivotally mounted on a shaft 38 supported in the side walls of housing 24. In FIG. 4, shaft 38 extends through a slot 40 in side wall 24a of housing 24 where it is connected with a rod 42 slidably mounted in a bracket 44 secured to side wall 24a. Threaded onto the opposite end of rod 42 from shaft 38 is a nut 46 for adjusting the tension on chains 28 of the elevator. By tightening nut 46, rod 42 is drawn toward the left, as viewed in FIGURE 2, to adjust shafts 38 and 34 toward the left to tighten chains 28.

Figure 5:
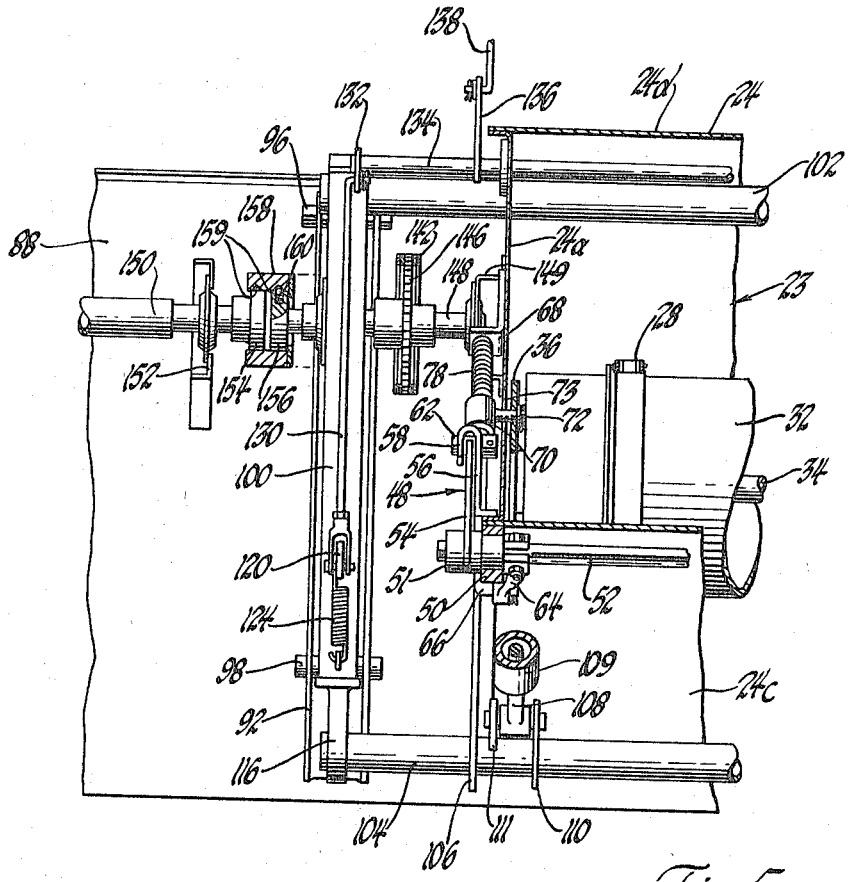
FIG. 5 is a sectional view taken on line 5—5 of FIG. 4.

In order to accommodate both cereal grains and heavier row crop material such as corn, the forward cylinder 32 of conveyor 26 is adjustable in a vertical direction by means of a conversion assembly 48 (FIG. 4 and 5). Assembly 48 includes a bearing block 50 in which is rotatably journalled the cylindrical mounting portion 51 of a segmental latching plate 54. Cylindrical portion 51 is formed with an axial opening of square or non-circular cross section for receiving a shaft 32 of complementary shape. Latching plate 54 is received in the space between the down-turned lip 58 formed on a bracket 56 secured to side wall 24a. Formed in lip 58 is a slot 60 for receiving a latch member 62 which is selectively engageable in one of a plurality of slots 53 formed in the upper edge of plate 54 to thereby secure plate 54 in selected angular positions relative to the axis of shaft 52.

Mounted on shaft 52 is a lever arm 64 which is pivotally connected at its free end with one end of a rod 66 having its other end slidable received in an apertured bracket 68 secured to side wall 24a. Slidably mounted on rod 66 is a floating, cylindrical spring support 70 having a transverse shank 72 which extends through a slot 73 (FIG. 5) in side wall 24a. The end of shank 72 is slidably received in a slot 74 formed in plate 36 which is disposed transversely to slot 73. Thus, movement of shank 72 in slot 73 causes pivotal movement of plate 36 about the axis of shaft 38, and slot 74 permits longitudinal adjustment of plate 36 through rod 42.

Spring support member 70 is urged towards engagement with a shoulder 76 formed integrally on rod 66 by means of a spring 78 seated between member 70 and bracket 68. Thus, cylinder 32 "floats," i.e., the cylinder is free to move between the limits defined by the upper edge of slot 73 and shoulder 76 on rod 66. By changing the position of latch plate 54, and hence the position of shoulders 76, the minimum opening between the lower run of chain 28 and the bottom wall 24c of housing 24, which defines a passage 79, can be adjusted in accordance with the type of crop material to be accommodated. For cereal grains, stop 76 is lowered, and for row crop material, such as cotton, stop 76 is raised to increase the minimum size of passage 79. Clockwise movement of plate 54 about the axis of shaft 52 as viewed in FIG. 4 increases the space between chain 28 and bottom wall 24c, and conversely, counter-clockwise movement about shaft 52 lowers shoulder 76 to thereby decrease the minimum opening between chain 28 and bottom wall 24c.

Elevator housing 24 is adapted to be coupled to either a grain head 80 or a corn head 82 (FIG. 1) each having the usual table 84 and transverse auger 86 for feeding the cut material into the passage 79. The rear wall 88 of the table (FIGS. 2, 3 and 4) is adapted to mate with the forward end portions 24e (FIG. 1) of elevator housing 24 and is formed with an opening 89 (FIG. 2) communicating with the elevator. Either of headers 80 or 82 may be connected with elevator housing 24 by means of a coupler or coupling means designated generally by reference numeral 90 in FIGURE 4.

Figure 2:
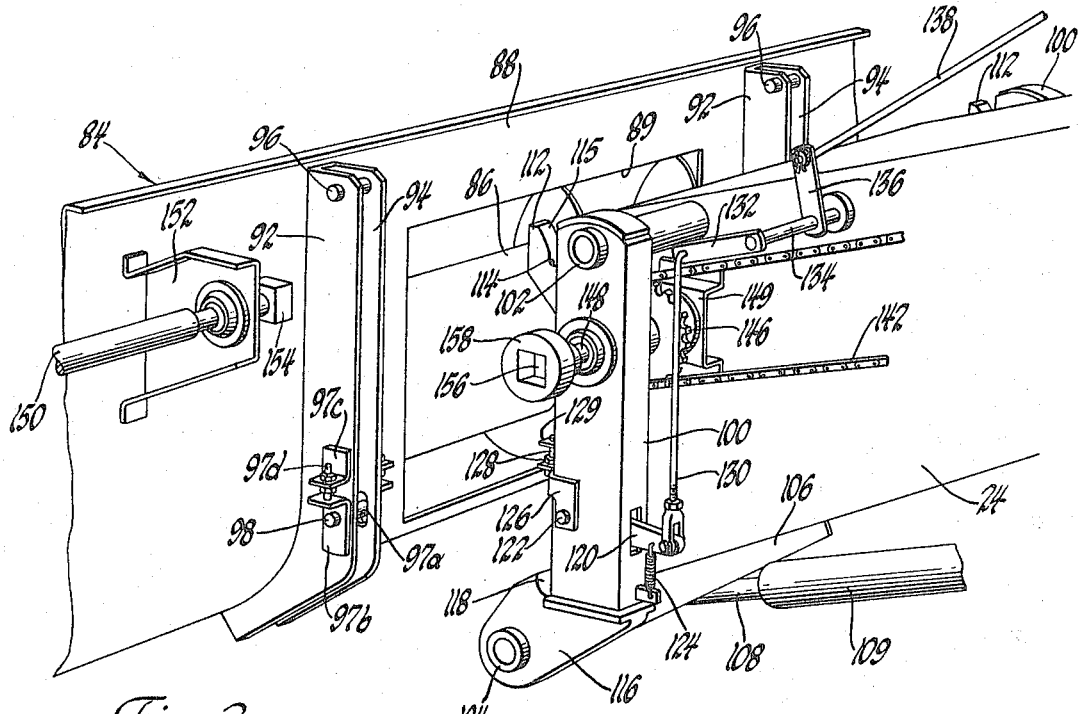
FIG. 2 is an enlarged perspective view of the coupling elements of the combine and detachable header.

With reference to FIGURES 2, 4 and 5, a pair of channel members 92 are secured to the rear wall 88 of the headers, the side walls of the channel forming a vertical groove or slot 94. Upper and lower coupling elements in the form of hook receiving pins 96 and 98 are mounted between the side walls of slot 94. In order to adjust the vertical distance between pins 96 and 98, pin 98 extends through slots 97a in the side walls of channel member 92 and is received in movable bracket members 97b (FIG. 2). Bracket members 97b are adjustably connected with fixed bracket elements 97c by threaded adjustment elements 97d.

Mounted on tubular beams 102 and 104 adjacent the forward ends of side walls 24a and 24b of elevator housing 24 is a coupling member 100. Beam 104 is supported in brackets 106 secured to bottom wall 24c. Power for pivoting elevator housing 24 upwardly or downwardly about the axis of shaft 25 is provided by hydraulic pistons 108 reciprocable in cylinders 109 and having their ends supported between apertured lugs 110 and 111 fixed to beam 104 (FIG. 5).

Carried at the upper end of coupling member 100 is an upper coupling element in the form of a hook 112 having a groove 114 for engagement with the upper coupling pin 96 on rear wall 88 of the header. Hook 112 has an inclined surface 115 extending from its upper edge to groove 114. Each lower coupling pin 98 is engageable with a groove 118 formed in lower coupling element in the form of a hook 116 at the lower end of coupling member 100. Vertical displacement of table 84 with respect to elevator housing 24 is prevented by means of a bell crank latching lever 120 pivotally mounted at 122 in a slot formed in member 100. Latching lever 120 is biased towards the latched position by a spring 124. In the latched position, one leg of bell crank lever 120 overlies pin 98 in groove 118 preventing separation of pin 98 and hook 116.

Pivot pin 122 of latching lever 120 extends through vertical slots in the side walls of coupling member 100 with its ends received in a movable bracket 126 slidably mounted with respect to member 100. Adjustment of bracket 126 vertically on member 100 is provided by means of an adjustment screw 128 engaged with a bracket element 129 fixed to coupling member 100.

Latching member 120 has its free end pivotally connected with the lower end of a link 130, the other end of which is pivotally connected with a lever 132 non-rotatably mounted on a shaft 134. An actuating lever 136 is non-rotatably mounted on shaft 134 and has its free end pivotally connected with an actuating rod 138 extending through a slot or the like in the operating platform 18. By pulling rod 138 toward the right in FIGURE 4, latching lever 120 pivots counter-clockwise about pin 122 to release the lower coupling elements and permit separation of the header and elevator housing upon downward movement of hooks 112 and 116 relative to pins 96 and 76, respectively.

Figure 3:
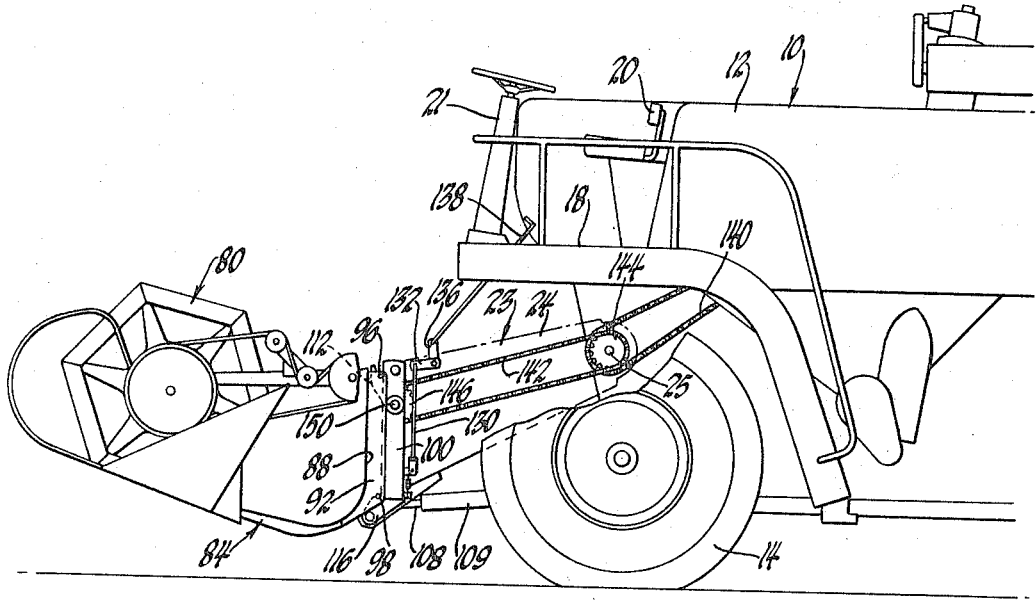
FIG. 3 is a partial side elevation of the combine having a grain head attached thereto.

With reference to FIG. 3, power for the headers is transmitted from the combine engine through chains 140 and 142. Chain 142 is mounted at one end on a sprocket 144 fixed to shaft 25, and at its other end on a sprocket 146 mounted on an output shaft 148 (FIG. 5). Shaft 148 is rotatably journalled in coupling member 100 as well as a bearing bracket 149 secured to side wall 24a.

When the coupling elements are engaged as shown in FIG. 4, output shaft 148 is disposed in axial alignment with an input shaft 150 carried by the header. Input shaft 150 is rotatably supported near one end on a bearing bracket 152 mounted on the rear wall 88 of the header (FIG. 5). The other end of shaft 150 is connected to drive the auger, snapping rolls and gathering chains of the corn header 82, or the auger, cutter, and reel of the grain header 80 in a well-known manner. Output shaft 148 may be coupled to input shaft 150 by means of shaft coupling elements 154 and 156 secured against relative rotation by means of a shaft coupling sleeve 158. Elements 154 and 156 are mounted, respectively, at the ends of shafts 148 and 150, and are of square or other non-circular shape. Sleeve 158 is formed with a complementary non-circular internal surface having axially spaced grooves 159 for engaging ball detents 160 mounted in each of elements 154 and 156. Sleeve 158 is loosely mounted on output shaft 148 for axial movement to connect and disconnect the shaft coupling elements 154 and 156.

Figure 6:
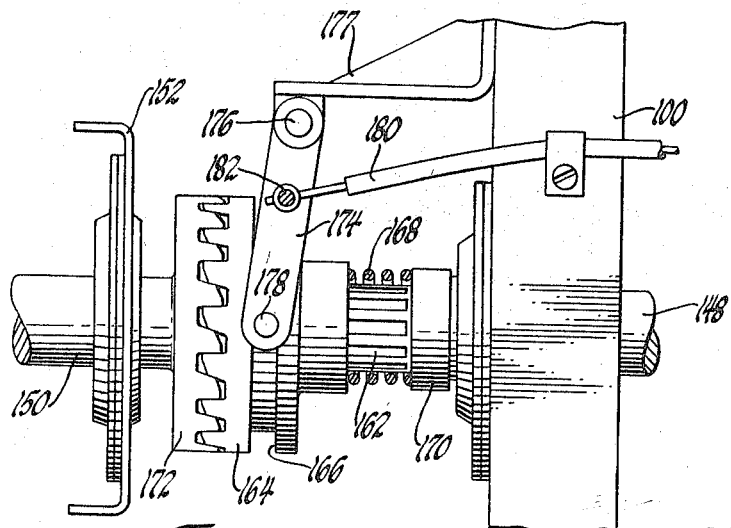
FIG. 6 is a detail view of an alternate remote control drive coupling.

An alternative, remotely controlled coupling arrangement is shown in FIG. 6 in which output shaft 148 is formed with a splined end portion 162 on which is slidably mounted a jaw clutch element 164. Clutch element 164 is formed with an annular groove 166 and is biased by a compression spring 168 seated against a shoulder 170 toward engagement with a clutch element 172 on the end of the header input shaft 150.

A clutch actuating lever 174 is pivotally mounted at 176 on a bracket 177 attached to coupling member 100. Mounted in the end of lever 174 is a pin 178 which is received in groove 166. To disengage clutch elements 164 and 172, lever 174 may be pivoted in a counter-clockwise direction about pivot 176 by means of a Bowden wire 180 attached to lever 174 by screw 182. As lever 174 pivots counter-clockwise, pin 178 acts through a groove 166 to shift clutch element 164 against spring 162 to disconnect the shafts. Bowden wire 180 may be latched in position on the operator's platform to disconnect the clutch elements.

The manner in which the headers are connected and disconnected can best be understood with reference to FIGS. 1, 2, 3 and 4. To couple the combine with one of the detached headers 80 or 82, the combine is moved into axial orientation with respect to the header and elevator 23 is pivoted downwardly by pistons 108 into a lowered or "drooped" position with respect to the header such that hooks 112 and 116 are disposed beneath pins 96 and 98, respectively, in slots 94. When the hooks are received in slots 94, cylinders 109 are actuated in the direction to pivot the elevator upwardly and lift the hooks into engagement with the pins.

As coupling member 100 moves upwardly with respect to the header, pins 98 strike the leading edge 120a of latching lever 120 (FIG. 4) forcing it to pivot counter-clockwise about pin 122 against spring 124 and permit pin 98 to ride into groove 118. As soon as pin 98 seats in groove 118, it clears the leading edge 120a and spring 124 returns latching lever 120 to its locked or latching position as shown in FIG. 4 in which it overlies pin 98 to prevent separation of the header and elevator.

In the illustrated embodiment, all of the vertical forces between the header and elevator are carried by the lower hooks 116 such that pins 96 do not seat completely in grooves 114, but react against hooks 112 to counteract the force tending to rotate the header about pins 98. Pins 96 and 98 enter grooves 114 and 118, respectively, substantially simultaneously as the elevator is raised to bring end portions 24e of housing 24 into engagement with rear wall 88 of the header.

When pins 96 and 98 come into engagement with their respective hooks as the mating surfaces between rear wall 88 and end portions 24e of the elevator engage, the header input shaft 150 comes into axial alignment with output shaft 148. With the shaft coupling arrangement shown in FIGS. 2 and 5, sleeve 158 is moved into position axially enclosing shaft coupling elements 154 and 156, the position shown in FIG. 5, to lock shafts 148 and 150 against relative rotation.

With the clutch arrangement of FIG. 6, control wire 180 is operated from platform 18 to shift clutch element 164 to the right to clear clutch element 172 as shafts 148 and 150 come into alignment. Subsequently, wire 180 is released and spring 168 urges clutch element 164 into engagement with the clutch element 172 to couple shafts 148 and 150 together.

When the header is to be disconnected from the combine, cylinders 109 are actuated in a direction to lower the elevator from the position shown in FIG. 3 until the header rests on the ground or other suitable support. Shafts 150 and 148 are then uncoupled, and latching lever 120 is actuated through rod 138 to release pin 98. With latching lever 120 in its unlatched position, cylinders 109 are again actuated to pivot the elevator downwardly to move hooks 112 and 116 out of engagement with pins 96 and 98, respectively.

Thus, coupling and uncoupling of the header from the combine is accomplished with no effort being required on the part of the operator except to operate the various control pedals and levers. The mating parts can be brought into alignment automatically by the operator from platform 18. When corn header 82 is attached to the combine, conveyor 26 of the elevator is preferably raised through plate 54 to accommodate the heavier crop material.

Although mechanical operating means are illustrated for latching lever 120 and the shaft coupling in FIG. 6, it is apparent that these elements can be controlled hydraulically or electrically. Moreover, the position of rod 138 on platform 18, as well as that of Bowden wire 80 may be varied as necessary for accessibility to the operator on platform 18.

We claim:

1. A combine including a main body, a movable elevator section, a header section supported by the elevator section, and coupling means detachably connecting the header section to the elevator section characterized by said coupling means comprising at least one vertical groove formed in one of said sections, a pair of vertically spaced, transverse pins mounted in said groove, and a pair of hooks on the other of said sections receivable in said groove and engageable with said pair of pins, said pair of hooks pointing in the same direction to simultaneously engage said pair of pins upon vertical movement of said elevator section relative to the header section, a resiliently biased latching lever operable in response to engagement of said hooks and pins to lock one of said hooks and pins against disengagement to prevent separation of said sections, and means operable from a remote position for selectively releasing said latching lever to prevent disengagement of said sections.

2. The construction defined in claim 1 wherein the space between said transverse pins is adjustable.

3. The construction defined in claim 1 including an output shaft on said elevator section and an input shaft in said header section, and shaft coupling means operable from a remote position to connect and disconnect said input and output shafts upon connection and disconnection, respectively, of said section.

4. A combine as defined in claim 3 in which said elevator section includes a housing with conveying means disposed therein for conveying crop material from the header to the main body through said housing along a passage defined between the conveying means and one wall of the housing, and further including means for selectively adjusting the position of the conveying means relative to said one wall to vary the size of the passage in accordance with the type of crop material to be encountered.

5. A combine including a main body with an elevator housing pivotally supported thereon, a header supported on the elevator housing, conveying means in the housing having an inlet end adjacent the header and a discharge end adjacent the main body for conveying crop material from the header to the main body along a passage defined between the conveying means and one wall of the elevator housing, means resiliently supporting the inlet end of the conveying means for movement toward and away from said one wall to decrease and increase, respectively, the size of said passage, stop means for limiting movement of said inlet end toward said one wall, a latching plate pivotally mounted on the elevator housing having a series of slots formed therein, a latch member pivotally mounted in the housing for selective engagement with one of said slots to lock the latching plate in a selected angular position, and means interconnecting said stop means with said latching plate for adjusting said stop member toward and away from said one wall in accordance with the angular position of said latching plate to selectively vary the minimum size of said passage.

6. A combine having a main body with a vertically movable elevator section and a header section supported by the elevator section, said elevator and header section having mating surfaces, coupling means operable upon movement of said mating surfaces into engagement for connecting the header section with the elevator section, an output shaft on the header section, an input shaft on the elevator section, shaft coupling means operable from a remote position to connect and disconnect said input and output shafts when said mating surfaces are engaged, and means operable from a remote position for releasing said coupling means permitting disconnection of said elevator and header sections.

7. A self-propelled combine harvester having a wheeled main body for housing threshing and crop-treating mechanism; a crop-gathering header having a rear wall with an opening therein; a forwardly projecting, open-ended housing mounted on the forward end of said main body for vertical pivotal movement about a horizontal axis; power means for actuating the housing about said horizontal axis; means detachably mounting the header on the forward end of said housing with said opening in axial alignment with the housing; feed means for feeding crop material from said header through the rear wall opening into said housing; elevator means in said housing for carrying crop material fed into said housing from said header into said main body; said detachable mounting means including a pair of couplings spaced transversely from each other on opposite sides of the housing and of the rear wall opening of the header; each of said couplings including a pair of complementary coupling elements, one of which is fixed to the housing and the other of which is fixed to the header; said complementary coupling elements being engageable to prevent downward and axial displacement of the header relative to the housing but permit upward transverse displacement of the header relative to the housing, said header coupling element projecting rearwardly of the rear wall of the header such that said coupling elements are engageable and disengageable upon upward and downward movement, respectively, of said housing relative to said header; and releasable coacting means on the header and the housing and spaced vertically beneath said couplings, said releasable coacting means including a first member fixed to one of said header and housing and a latching member pivotally mounted on the other of said header and housing, said latching member being movable to engage said first member when the header is coupled to the housing by said complementary coupling elements to secure the header against pivotal movement relative to the housing about said complementary elements, said latching member being disengageable from said first member to release said coacting means, whereby the housing may be coupled to the header by actuating said power means to pivot the housing upwardly to engage the housing coupling elements with the header coupling elements, and the housing may be uncoupled from the header by actuating the power means to pivot the housing downwardly when said coacting means is released until the header rests on a stationary support causing the housing to move downwardly relative to the header and disengage the housing coupling elements from the header coupling elements.

8. A self-propelled combine harvester as claimed in claim 7 wherein one coupling element of said pair of coupling elements comprises a hook, and the other coupling element comprises a pin engageable with said hook.

References Cited

UNITED STATES PATENTS

| | | | |
|---|---|---|---|
| 2,763,115 | 9/1956 | Skromme | 56—2 X |
| 2,867,958 | 1/1959 | Allen | 56—21 |
| 3,035,384 | 5/1962 | Mitchell | 56—2 X |

ABRAHAM G. STONE, *Primary Examiner.*

ANTONIO F. GUIDA, *Examiner.*